United States Patent Office 3,291,857
Patented Dec. 13, 1966

3,291,857
CURABLE POLYMERS
William W. Howerton, Harvard, Mass.
(338 Callender Lane, Wallingford, Pa.)
No Drawing. Filed Feb. 17, 1960, Ser. No. 9,183
6 Claims. (Cl. 260—836)

This invention relates to thermoplastic resin compositions which are capable of undergoing further polymerization or curing and provides compositions particularly well adapted for extrusion and similar forming operations and having a usefully long shelf life. The compositions of this invention are typically mixtures of polyvinyl chloride or similar thermoplastic resin, and a compatible polymerizable compound, and may also include catalysts or suitable free radical activator.

Mixtures suitable for extrusion and like processes can be rendered heat hardenable by incorporating a cross linking monomer and a catalyst or other source of free radicals, e.g., heat. When extrusion is carried out in the customary way the resin may undergo further polymerization during the extrusion process, but ordinarily subsequent heating is utilized to complete the polymerization. Polymerizable mixtures however have a tendency to react even at room temperature, and therefore tend to precure during storage. Dry blended mixtures, consisting of resin in granular or other particulate form and a cross linking monomer do not however precure significantly in the absence of a catalyst, but with such mixtures a catalyst must be added prior to extrusion.

In one aspect this invention provides a dry blend polymerizable mixture suitable for extrusion, which includes a polymerization catalyst. Hydroperoxide catalysts are inhibited by the presence of oxygen and may accordingly be incorporated in a dry blend mixture if air or other source of oxygen is present to keep the catalyst inactive. During extrusion the air is driven from the mixture by the combined heat and pressure of the screw, and polymerization is initiated. After extrusion the resin is in a compact form into which air cannot enter, and polymerization will proceed to completion.

The scope of this invention, however, is not limited to dry blend mixtures having an extended shelf life. In many fabricating operations such as extrusion, it is preferable to have the extrudable material in a diced or similar form for ease of handling. Since much less surface area is exposed to the air in these diced compounds, curing is not inhibited by oxygen and the cross-linking monomer in the compound is caused to polymerize by the activating properties of the peroxides contained within the mixture. Therefore the invention also provides a means of preventing this precuring in diced, milled, fluxed, or other easily handable compounds.

The invention provides dry, particulate, resinous compositions adapted for extrusion which are unreactive at room temperature. In one embodiment these mixtures contain a polymer of vinyl chloride and a cross-linking monomeric material polyfunctional in vinyl groups. The mixtures can either be in the form of a dry blend or in the form of diced particles, whichever is preferred.

In a preferred embodiment a catalyst such as hydroperoxide is included in the mixture. It may be added as a component of a dry blend since sufficient oxygen is present in dry blended compounds to prevent precuring. However if the polymerizable mixture is to be diced or otherwise compacted, the mixture must be divided into two physically separate fractions in intimate admixture, one fraction containing part of the resin and all of the cross-linking monomer and the other fraction containing part of the resin and all of the catalyst. These fractions are physically discrete particles co-existing in physical combination but unreactive at room temperature.

The method of making polymerizable mixtures containing both cross-linking monomer and catalyst is as follows. A portion of thermoplastic resin is fluxed and diced, or pelleted, milled, or in some other similar manner combined with a polymerizable compound to form a first fraction of the polymerizable mixture. This fraction is stable at room temperature so that curing will not occur without first applying heat. Similarly, if a catalyst is desired, another portion of the resin is combined in similar manner with the catalyst to form a second fraction. If a cure activator is required for faster cure, it may be blended with still another portion of the resin in a fluxed, diced, or milled form to make another separate fraction. These fractions are blended together in proper proportions to form the complete compound. The compounded particles comprising each fraction in the mixture, while coexisting in physical combination, provide a stable, polymerizable mixture yet remain physically discrete and unreactive at room temperature.

This invention includes curable compositions containing any of numerous thermoplastic resins. A preferred embodiment uses polyvinyl chloride resin, but polyvinyl acetate, vinyl chloride-acetate copolymers, polyethylene, polypropylene, methacrylate polymers and copolymers, polystyrene polymers, acrylic rubber polymers, butyl rubber, GR–S rubber, BUNA–N rubber, high styrene acrylonitrile copolymers, natural and synthetic rubber, cellulosic polymers, polyesters, epoxy polymers, urethane polymers, polychloroprene, nylon type polyamides, and many other polymers and mixtures thereof will serve very well, as will also terpolymers such as that formed of acrylonitrile, butadiene and styrene, and known as ABS.

Any cross-linking monomers may be used that are sufficiently compatible and not too reactive to have a practicable or usable storage life. Examples are allylic compounds such as triallyl chloride, triallyl cyanurate, or methallyl polyesters, polyethylene glycol dimethacrylate, glycidyl methacrylate, diepoxides, divinyl benzene, monomers containings divinyl esters, vinyl crotonate, dicrotonates, divinyl carbinol, and diamines, and similar compounds.

The free radical generator may be any known type of activating agent such as peroxide or hydroperoxide, e.g., cumene hydroperoxide, or heat.

In the compounds of the invention, stabilizers, plasticizers, extenders, other polymers—saturated or unsaturated, cure activators such as tertiary amines, fillers, pigments, and other catalysts may be admixed as required.

The compounds prepared according to this invention have a relatively long shelf life. When they are finally fabricated, the compounds become homogeneous and the cure is activated and continues to completion during and after the extrusion and cooling. If a peroxide rather than a hydroperoxide is used in the composition, additional heat is required after fabrication to complete the cure.

It will be obvious to those skilled in the art that the above described techniques may be applied to compounds of all types of polymers where it is desired and practical to produce curable compositions having at least one reactive material or compound in intimate contact with another reactive material or compound, and requiring the application of heat to produce useful cured compositions. The following are examples of representative reactive formulations within the scope of this invention: vinyl chloride and a compound containing carboxyl groups reacting with a copolymer of vinyl chloride and a compound containing nitrile groups; an unsaturated vinyl chloride copolymer reacting with a cross-linking monomer; a copolymer of vinyl chloride and a compound containing epoxy groups reacting with a copolymer of vinyl chloride and a compound containing carboxyl groups; a vinyl acetate copolymer having a tertiary hydrogen atom reacting with a cross-linking monomer; a copolymer of vinyl chloride and a compound containing an acrylic ester reacting with a polyvinyl chloride mixture containing zinc oxide and a peroxide; a copolymer of vinyl chloride and a compound containing acrylonitrile reacting with a polyvinyl chloride mixture containing zinc oxide and a peroxide; a polyvinyl chloride composition containing an acrylic ester rubber, such as butadiene-acrylonitrile rubber, reacting with a polyvinyl chloride composition containing curatives for the acrylic ester rubber; a polyvinyl chloride composition containing a styrenated polyester reacting with a polyvinyl chloride composition containing a cross-linking monomer; a polyvinyl chloride composition containing an epoxy plasticizer reacting with a polyvinyl chloride composition containing an acid anhydride; and many other combinations.

When any of the above types of curable compounds contain peroxides, and the resin contains unsaturation or tertiary hydrogen atoms in its structure, the cure of such compositions results in the cross-linking monomer being grafted or cross-linked into the structure of the resin, further enhancing the properties of the cured composition. This grafting also occurs when additives to the polymerizable mixture contain unsaturation or tertiary hydrogen atoms in their structure.

Benefits accruing from the foregoing types of curable compositions are several. A curable polyvinyl chloride compound having an extended storage life can be prepared. The cure of the finished product can be completed after fabrication without the use of any special steps or equipment such as a continuous vulcanizing unit which is often required after extruding certain curable compositions. According to a preferred embodiment, products of vinyl chloride polymers and copolymers can be produced which have higher temperature distortion points, improved creep resistance, improved solvent resistance, better retention of plasticizer, improved tear strength, improved abrasion resistance and many other superior qualities.

While not intending to limit the scope of the invention, preferred embodiments thereof are shown in detail in the following examples:

*Example 1*

Ingredients:                    Proportions (parts by weight)
  Resin—Polyvinyl chloride (PVC) (Geon 101) __ 100
  Plasticizer—Dioctyl phthallate (DOP) _____ 60
  Stabilizer—Tribase (basic lead sulfate) _____ 6
  Lubricant—Acrawax (a synthetic wax) _____ 0.4

Example 1 is representative of a typical, conventional, premixed PVC extrusion formulation. The ingredients are premixed, milled for five minutes at 280° F., sheeted off into six inch wide, one-eighth inch thick strips, diced into one-eighth inch cubes, and immediately cooled. The cubes are fed into a standard plastics extruder operating at an average temperature of about 340° F. and are extruded in ribbon form.

*Example 2*

| Ingredients | Proportions (parts by weight) | |
|---|---|---|
| | A Fraction | B Fraction |
| Resin, PVC (Geon 101) | 100 | 100 |
| Plasticizer, DOP | 60 | 20 |
| Cross-linking monomer, Acromer E-48, a polyethylene glycol dimethacrylate | 0 | 40 |
| Stabilizer, Tribase | 6 | 6 |
| Lubricant, Acrawax | 0.4 | 0.4 |
| Catalyst, Cumene hydroperoxide | 8 | 0 |

Example 2 is a formulation for a preferred embodiment of the invention containing two fractions. The portion of the resin in the A fraction is premixed with the rest of the ingredients in that fraction containing all the hydroperoxide activator, milled for five minutes at 280° F., sheeted off into six inch wide, one-eighth inch thick strips, diced into one-eighth inch cubes, and immediately cooled. The B fraction, containing all the cross-linking monomer, is similarly processed. The fractions are then blended together to form the complete compound, the particles comprising each fraction remaining physically discrete and unreactive at room temperature. The cubes are fed into a standard plastics extruder operating at an average temperature of about 340° F. and are extruded in ribbon form.

It will be noted in Example 2 that the combined compound A and B differ from the conventional formulation in Example 1 in that one-third of the plasticizer is replaced by Acromer E-48 and four parts of cumene hydroperoxide are added per hundred parts of resin.

Two hours after extrusion of this improved formulation, the extruded product has a tensile strength which is typically about 15 percent greater than the product made from the ingredients of Example 1, and a hardness greater than that of Example 1 by about 10 percent. After two weeks, the tensile strength of the extruded product of Example 2 shows an increase over those of Example 1 of about 50 percent, and the hardness an increase of about 25 percent. It will thus be seen that the two fractions of Example 2 are consolidated in the extruder, and that extrusion initiates the cure of the extruded product which continues to completion after extrusion is finished.

*Example 3*

Ingredients:                    Proportions (parts by weight)
  Resin—PVC (Geon 101) _____ 100
  Plasticizer—DOP _____ 40
  Cross-linking monomer—Acromer E-48 ____ 20
  Stabilizer—Tribase _____ 6
  Lubricant—Acrawax _____ 0.4

A diced compound is made according to the procedure outlined for each fraction of Example 2, having the above formulation. It will be noted that this compound contains no peroxide or chemical means of activation. The compound is extruded in the same manner as that used in Example 2. The extruded compound is placed in an oven overnight at 120° C. The extruded product showed hardness and tensile strength essentially the same as in Example 2. In this procedure heating is used to effect polymerization.

*Example 4*

Ingredients:                    Proportions (parts by weight)
  Resin—PVC (Geon 101) _____ 100
  Plasticizer—DOP _____ 40
  Cross-linking monomer—Acromer E-48 ____ 20
  Stabilizer—Tribase _____ 6
  Lubricant—Acrawax _____ 0.4
  Catalyst—Cumene hydroperoxide _____ 4

The ingredients in the above formulation are dry blended e.g. simply mixed without milling or fusing the constituents. It will be noted that this formulation is the same as that resulting from combination of the A and B fractions of Example 2. This mixture is stored for a period of four months in a moisture-proof fiber drum and is extruded in the same manner as used for each fraction of Example 2. The extruded product has essentially the same hardness and tensile strength characteristics as the product of Example 2.

Example 5

| Ingredients | Proportions (parts by weight) | |
|---|---|---|
| | A Fraction | B Fraction |
| Resin, PVC (Geon 101) | 100 | 100 |
| Plasticizer, Paraplex G-62, an epoxidized soybean oil plasticizer | 40 | 0 |
| Plasticizer, DOP | 30 | 70 |
| Stabilizer, Tribase | 6 | 6 |
| Lubricant, Acrawax a synthetic wax having a melting point of about 95 to 97° C. and a specific gravity of 1.04 | 0.4 | 0.4 |
| Pyromellitic dianhydride (reactive with the epoxy plasticizer) | 0 | 17 |

The above two fractions are formulated, one containing an epoxy plasticizer and the other containing pyromellitic dianhydride. The two fractions are prepared and blended in the same manner as used in Example 2. The resultant extruded product shows a much greater hardness and a lower elongation than a similar product prepared without the pyromellitic dianhydride.

Example 6

| Ingredients | Proportions (parts by weight) | |
|---|---|---|
| | A Fraction | B Fraction |
| Resin, PVC (Geon 101) | 100 | 100 |
| Plasticizer, DOP | 30 | 60 |
| Cross-linking monomer, Triallyl cyanurate | 30 | 0 |
| Stabilizer, Tribase | 6 | 6 |
| Lubricant, Acrawax | 0.4 | 0.4 |
| Catalyst, Cumene Hydroperoxide | 0 | 8 |

The above formulated diced fractions are compounded, with one containing triallyl cyanurate and the other containing cumene hydroperoxide. They are blended together in the manner described in Example 2 and extruded. After two weeks the extruded product is appreciably harder than the product of Example 1, and has an elongation significantly less.

Example 7

| Ingredients | Proportions (parts by weight) | |
|---|---|---|
| | A Fraction | B Fraction |
| Resin, PVC (Geon 101) | | 100 |
| Resin, PVC Acetate copolymer resin (Geon 428) | 100 | 0 |
| Plasticizer, DOP | 20 | 60 |
| Cross-linking monomer, Acromer E-48 | 40 | 0 |
| Stabilizer, Tribase | 6 | 6 |
| Lubricant, Acrawax | 0.4 | 0.4 |
| Catalyst, Cumene hydroperoxide | 0 | 8 |

These two above-formulated fractions are blended and extruded as in Example 2 except that the extrusion in this case is in the form of a tube. After one week a test on this tube under hydraulic pressure shows the creep, or increase in diameter of the extruded product is negligible whereas similar extrusion products containing only the PVC resin without PVC-acetate copolymer resin show a much greater increase in diameter.

The compositions of this invention may be processed not only by conventional extrusion techniques, but also by similar methods employing heat pressure and agitation. They are believed to be particularly well suited for use in the recently developed elastic melt extruder described in Modern Plastics, vol. 37, No. 2, pp. 107–114 (October 1959).

While there have been shown what is considered to be preferred embodiments of the invention, it is to be understood that many modifications and changes may be made therein without departing from the essential aspects of the invention. It is intended, therefore, in the appended claims to cover all such changes and modifications as fall within the true scope of the invention.

What is claimed is:

1. An extrusion and molding composition which has good shelf-life in a single container and which when fused and mixed becomes reactive to produce a cross-linked polymer, said composition comprising an intimate mixture of at least first and second solid, discrete particles of a thermoplastic polymer, said thermoplastic polymer being selected from the group consisting of polyvinyl chloride and thermoplastic heteropolymers of vinyl chloride with monofunctional vinyl monomers, said first particles having fused therein a first member of a reactable combination and said second particles having fused therein a second member of said reactable combination, said reactable combination being selected from the group consisting of combination (A) and combination (B), said combination (A) having as its first member a vinyl monomer, which is polyfunctional in polymerizable vinyl groups and which is polymerizable to a cross-linked polymer and as its second member a polymerization catalyst for said vinyl monomer, and said combination (B) having as its first member a compound having reactable epoxy groups therein which is curable to a cross-linked polymer and as its second member a curing agent for said compound having reactable epoxy groups therein.

2. A composition as defined in claim 1 wherein said reactable combination is combination (A).

3. A composition as defined in claim 1 wherein said reactable combination is combination (B).

4. A composition as defined in claim 1 wherein said thermoplastic polymer is polyvinyl chloride.

5. A composition as defined in claim 1 wherein said thermoplastic polymer is polyvinyl chloride, said reactable combination is combination (A) and said monomer is a polyethylene glycol dimethacrylate.

6. A composition as defined in claim 1 wherein said thermoplastic polymer is a copolymer of vinyl chloride and vinyl acetate.

References Cited by the Examiner

UNITED STATES PATENTS

| 2,155,590 | 4/1939 | Garvey | 260—884 |
| 2,558,139 | 6/1951 | Knock et al. | 260—884 |
| 2,730,457 | 1/1956 | Green et al. | 117—36.8 |
| 2,914,507 | 11/1959 | Martin | 260—837 |
| 2,921,923 | 1/1960 | Bruin et al. | 260—47 |
| 2,929,794 | 3/1960 | Simon et al. | 260—33.8 |

FOREIGN PATENTS 583,471  12/1946  Great Britain.

OTHER REFERENCES

Modern Plastics, vol. 37, No. 2, pp. 107–114 (October 1959).

MURRAY TILLMAN, *Primary Examiner.*

DANIEL ARNOLD, LEON J. BERCOVITZ, WILLIAM H. SHORT, *Examiners.*

J. W. SANNER, E. J. TROJNAR, P. LIEBERMAN,
*Assistant Examiners.*